United States Patent [19]
Yamada et al.

[11] Patent Number: 5,439,419
[45] Date of Patent: Aug. 8, 1995

[54] PULLEY DEVICE FOR CONTINUOUSLY VARIABLE TRANSMISSION

[75] Inventors: Masahiko Yamada, Nagoya; Wataru Onuki, Atsugi; Hirofumi Okahara; Nobuaki Mochizuki, both of Isehara, all of Japan

[73] Assignees: Nissan Motor Co., Ltd., Yokohama; Aichi Machine Industry Co., Ltd., Nagoya, both of Japan

[21] Appl. No.: 187,285

[22] Filed: Jan. 27, 1994

[30] Foreign Application Priority Data

Jan. 27, 1993 [JP] Japan .................. 5-031335

[51] Int. Cl.⁶ .............................................. F16H 59/00
[52] U.S. Cl. ............................................ 474/18; 474/28
[58] Field of Search .............. 474/8, 18, 28; 477/45, 477/46

[56] References Cited

U.S. PATENT DOCUMENTS

| | | | |
|---|---|---|---|
| 4,228,691 | 10/1980 | Smirl | 474/28 X |
| 4,484,493 | 11/1984 | Yamamuro et al. | 74/689 |
| 4,494,942 | 1/1985 | Hirano et al. | 474/28 |
| 4,510,822 | 4/1985 | Yamamuro et al. | 474/28 X |
| 4,663,991 | 5/1987 | Nakamura et al. | 474/28 X |
| 4,672,864 | 6/1987 | Morimoto | 474/28 X |
| 4,704,097 | 11/1987 | Sakai | 474/28 |
| 4,735,113 | 4/1988 | Yamamuro et al. | 74/866 |
| 4,735,597 | 5/1988 | Cadee | 474/28 |
| 4,850,936 | 7/1989 | Nakamura | 474/28 |
| 4,948,370 | 8/1990 | Yamada | 474/28 |
| 4,977,798 | 12/1990 | Takahashi | 474/28 X |

FOREIGN PATENT DOCUMENTS

| | | |
|---|---|---|
| 64-30961 | 2/1989 | Japan . |
| 2-48653 | 4/1990 | Japan . |
| 2-71153 | 5/1990 | Japan . |
| 3-189446 | 8/1991 | Japan . |

Primary Examiner—Roger J. Schoeppel
Attorney, Agent, or Firm—Foley & Lardner

[57] ABSTRACT

A pulley device includes a moveable conical pulley component which is moveable to a stationary conical pulley component by a servo motor. The servo motor includes a cylinder fixedly held with respect to a shaft portion of the stationary conical pulley component, and a piston fixed to the moveable conical pulley component and slidably engaging the cylinder. The servo motor also includes an auxiliary cylinder reduced in diameter than the cylinder and fixed with respect to the shaft portion, and an auxiliary piston fixed to the moveable conical pulley component. The auxiliary piston is received in the auxiliary cylinder.

20 Claims, 5 Drawing Sheets

PULLEY DEVICE FOR CONTINUOUSLY VARIABLE TRANSMISSION

BACKGROUND OF THE INVENTION

The present invention relates to a pulley device for a continuously variable transmission.

Continuously variable transmissions are known which use, as a continuously variable ratio change unit, a driver pulley, a driven or follower pulley and a V-belt interconnecting these pulleys. There is a growing demand for reduction in overall size of the continuously variable transmissions of this kind. Reduction in size of the pulley device, particularly its servo motor, is demanded.

U.S. Pat. No. 4,494,942, issued to Hirano et al. on Jan. 22, 1985 discloses a continuously variable transmission including a continuously variable ratio change unit. According to this continuously variable ratio change unit, a driver pulley and a follower pulley are interconnected by a V-belt. The driver pulley comprises a stationary conical pulley component including a shaft portion, a moveable conical pulley component mounted to the shaft portion for rotation therewith and for movement relative to the shaft portion in such a direction as to vary a distance between the conical pulley components. The stationary and moveable conical pulley components have conical faces opposed to each other for fricional engagement with the V-belt. In order to vary the distance between the opposed conical faces, a stationary piston is fixed to the shaft portion, and the moveable conical pulley component has an integral cylinder slidably engaging the stationary piston at an outer periphery thereof to define a fluid chamber on the opposite side of the moveable conical pulley component to the conical face thereof.

JP-A 3-189446 teaches to provide a boost piston. According to this teaching, a stationary piston includes a tubular portion radially opposed to a cylinder fixed to a moveable conical pulley component, an auxiliary stationary piston is fixed to the shaft portion and extends radially outwardly to slidably engage the cylinder, and a boost piston is disposed between the two stationary pistons. The boost piston is annular and has an outer periphery fixed to the cylinder and an inner periphery slidably engaging the tubular portion. The boost piston, auxiliary stationary piston, tubular portion and cylinder cooperate with each other to define a boost fluid chamber. According to this teaching, the cylinder with increased axial dimension is needed. Besides, the stationary pistons are in slidable engagement with the common cylinder. Thus, a considerable space is needed for accommodating this cylinder.

SUMMARY OF THE INVENTION

The present invention provides a pulley device comprising:
a first conical pulley component including a shaft portion and a first conical face;
a second conical pulley component mounted to said shaft portion for rotation therewith and including a second conical face opposed to said first conical face, said second conical pulley component being slidably mounted to said shaft portion for movement relative to said shaft portion in such a direction as to vary a distance between said opposed first and second conical faces;
a cylinder;
means for fixedly holding said cylinder with respect to said shaft portion; and
a piston fixed to said second conical pulley component, said piston being slidably received within said cylinder.

The present invention also provides a pulley device, comprising:
a first conical pulley component including a shaft portion and a first conical face;
a second conical pulley component mounted to said shaft portion for rotation therewith and including a second conical face opposed to said first conical face, said second conical pulley component being slidably mounted to said shaft portion for movement relative to said shaft portion in such a direction as to vary a distance between said opposed first and second conical faces;
a cylinder;
a cylinder end wall integral with and extending radially inwardly from said cylinder;
an auxiliary cylinder having one end portion in engagement with said cylinder end wall and an opposite end; and
an auxiliary cylinder end wall integral with and extending radially inwardly from said opposite end of said auxiliary cylinder, said cylinder end wall defining an annular disc portion fixedly coupled with said shaft portion.

DETAILED DESCRIPTION OF THE INVENTION

Figure 1:
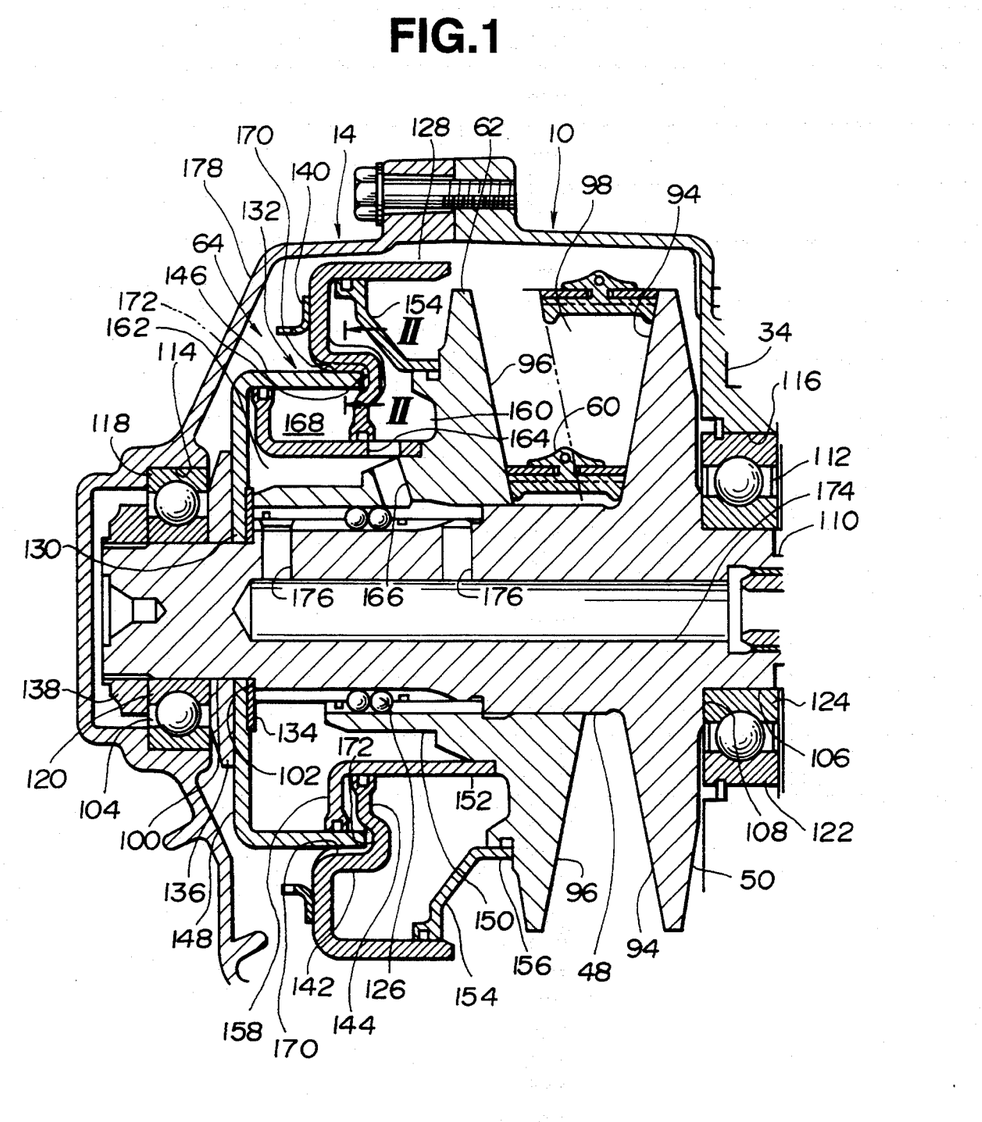
FIG. 1 is a fragmentary view of a continuously variable transmission shown in FIG. 3, illustrating a first embodiment of a pulley device according to the present invention.
Figure 2:
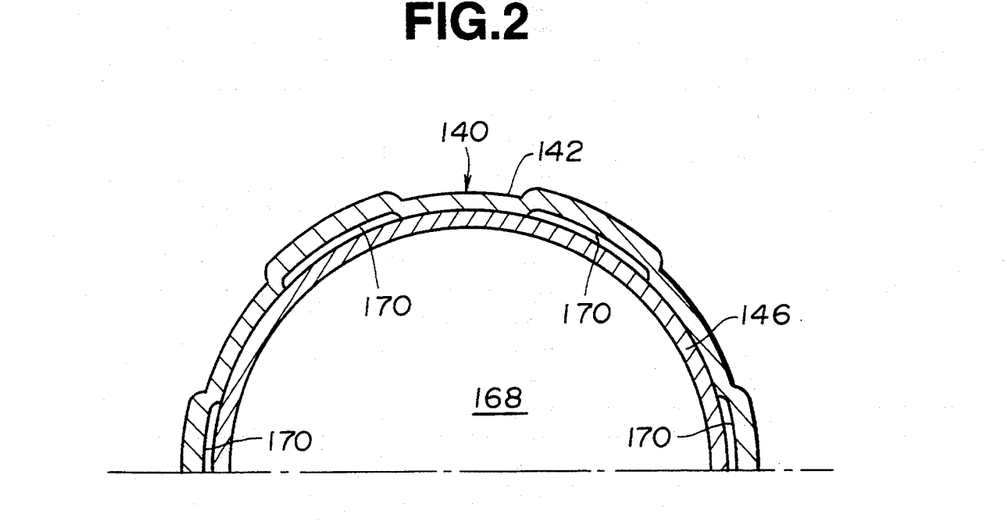
FIG. 2 is a fragmentary view of a radial section of an auxiliary cylinder at a portion taken along the line II—II in FIG. 1.
Figure 3:
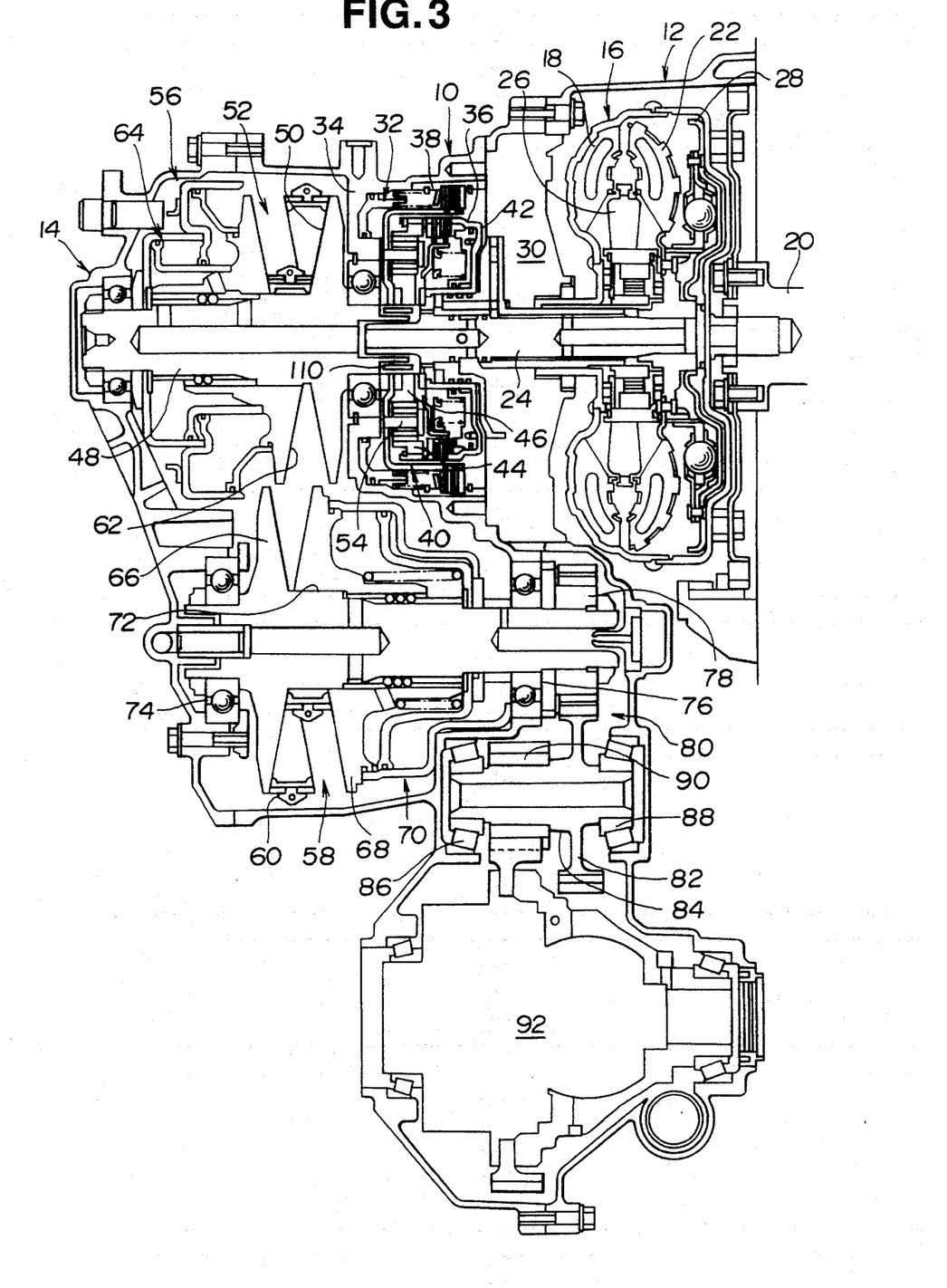
FIG. 3 is a view showing the continuously variable transmission.

Referring to FIGS. 1 to 3, there is shown in FIG. 3 a continuously variable transmission.

Referring particulary to FIG. 3, the transmission includes a casing 10 having one end opening closed by a converter housing 12 and an opposite end opening closed by an end cover 14. In the conventional manner, a hydrokinetic torque transmitting unit in the form of a lock-up type torque converter 16 is disposed in the converter housing 12 and includes a pump impeller 18 drivingly connected to an engine crankshaft 20, a turbine runner 22 drivingly connected to an input shaft 24, a stator 26, and a lock-up piston 28. The pump impeller 18 is drivingly connected to a pump, not shown, within a pump housing 30. The pump housing 30 is disposed between the torque converter 16 and a change direction or forward reverse changeover gearing 32.

This gearing 32 is disposed in the casing 10 between the pump housing 30 and a partition 34 and functions to establish a forward drive when a forward clutch 36 is engaged with a reverse brake 38 released or a reverse drive when the reverse brake 38 is applied with the forward clutch 36 disengaged. The gearing 32 includes a simple planetary gear set 40. The forward clutch 36 includes a clutch drum 42 drivingly interconnecting the input shaft 24 and an internally toothed ring gear 44. When it is engaged, the forward clutch 36 interconnects the ring gear 44 and a sun gear 46. The sun gear 46 is splined to an output shaft in the form of a shaft portion 48 of a stationary conical pulley component 50 of a driver pulley 52. When it is applied, the reverse brake 38 anchors or holds a pinion carrier 54 stationary with respect to the casing 10.

A continuously variable ratio change unit in the form of a pulley unit 56 is not fully received in the casing 10 and projects outwardly through the opposite end opening of the casing 10. This projected portion of the pulley unit 56 is concealed by the end cover 14 secured to the casing 10. This end cover 14 closes this opposite end opening of the casing 10.

This pulley unit 56 includes two pulley devices, namely the above-mentioned driver pulley 52 and a driven or follower pulley 58. A V-belt 60 drivingly interconnects the driver and follower pulleys 52 and 58. The driver pulley 52 includes, in addition to the stationary conical pulley component 50, a moveable conical pulley component 62. The driver pulley 52 also includes a servo motor 64 for moving the moveable conical pulley component 62. The follower pulley 58 includes a stationary conical pulley component 66, a moveable conical pulley component 68 and a servo motor 70 for moving the moveable conical pulley component 68. The stationary conical pulley component 66 includes a shaft portion 72. The moveable conical pulley component 68 is mounted, by a ball spline connection, to the shaft portion 72 for rotation therewith, but for axial movement relative to the shaft portion 72. This shaft portion 72 is rotatably supported by ball bearings 74 and 76. The ball bearing 74 is situated at the end cover 14, while the ball bearing 76 is siatuted at the casing 10. The shaft portion 76 extends axially beyond the ball bearing 76 to fixedly carry a driver gear 78 of a gear train 80.

The gear train 80 includes, in addition to the driver gear 78, an idler gear 82 integral with an idler shaft 84. The idler shaft 84 is rotatably supported by two taper bearings 86 and 88. The idler gear 82 meshes the driver gear 78. Fixedly supported by the idler shaft 84 is a pinion 90. The pinion 90 is drivingly connected to a differential 92.

The continuously variable transmission thus far described operates in substantially the same manner as a known continuously variable transmission disclosed in U.S. Pat. No. 4,735,113, Yamamuro et al., issued on Apr. 5, 1988, which Patent is hereby incorporated by reference in its entirety.

Referring now to FIG. 1, the driver pulley 52 is further described. The conical pulley component 50 and moveable conical pulley component 62 have conical faces 94 and 96 which are opposed to each other to define therebetween a groove 98 in which the V-belt 60 is disposed. The V-belt 60 is frictionally engaged by the opposed conical faces 94 and 96 and interposed therebetween. The shaft portion 48 has one reduced diameter end portion 100 and a shoulder 102 connected to the reduced diameter end portion 100. This reduced diameter end portion 100 is rotatably supported by a ball bearing 104. The shaft portion 48 has the opposite reduced diameter end portion 106 and a shoulder connected to the reduced diameter end portion 106. A central boss 100 projects from the axial end of the reduced diameter end portion 106 and splined to the sun gear 46. This reduced diameter end portion 106 is rotatably supported by a ball bearing 112.

The ball bearing 104 is received in a ball bearing bore 114 with which the end cover 14 is formed, while the ball bearing 112 is received in a ball bearing bore 116 with which the partition 34 of the casing 110 is formed. The ball bearing 104 includes an outer race 118 engaging the wall defining the ball bearing bore 114 and an inner race 120 engaging the reduced diameter end portion 100. The ball bearing 112 includes an outer race 122 engaging the wall defining the ball bearing bore 116 and an inner race 124 engaging the reduced diameter end portion 106.

The moveable conical pulley component 62 is mounted, by a ball spline connection 126, to the shaft portion 72 for rotation therewith. Owing to the spline connection 126, the moveable conical pulley component 62 is slidably mounted for axial movement relative to the shaft portion 72 in such a direction as to vary a distance between the opposed conical faces 94 and 96.

The servo motor 64 includes a cylinder 128, an annular disc portion 130 and an intermediate portion or structure 132 interconnecting the annular disc portion 130 and cylinder 128. As is readily seen from FIG. 1, the cylinder 128 is fixedly held with respect to the shaft portion 48 by means of the intermediate portion 132 and annular disc portion 130. The cylinder 128 is held concentrically with respect to the shaft portion 48 and defines the outermost radial periphery of the servo motor 64. It should be noted that the annular disc portion 130 defines the outermost axial periphery of the servo motor 64.

The annular disc portion 130 is coupled with the reduced diameter end portion 100 and disposed adjacent to the shoulder 102. An annular shim 134 is disposed between the shoulder 102 and annular disc portion 130. Disposed between the annular shim 134 and the inner race 120 of the ball bearing 104 is an annular plate 136. This annular plate 136 serves as a spacer and functions to reinforce the annular disc portion 130. In order to keep the annular disc portion 130 and annular shim 134 in axial tight manner with respect to the shoulder 102, a nut 138 threadedly engages the reduced diameter end portion 100. Tightening the nut 138 causes the inner race 120, annular plate 136, annular disc portion 130 and annular shim 134 to be firmly interposed between the nut 138 and the shoulder 102. The radial dimension of the annular shim 134 is chosen such that the annular shim 134 extends radially outwardly further than the radial surface of the shoulder 102 does. Owing to provision of the annular shim 134, the stress applied to the annular disc portion 130 upon tightening the nut 138 is evenly distributed. Thus, application of substantial local stress to the annular disc portion 130 is prevented.

As viewed in FIG. 1, the cylinder 128 has one or righthand axial end disposed adjacent to the outer periphery of the conical face 96 of the moveable conical pulley component 62. Axial distance between the righthand axial end of the cylinder 128 is the minimum when the moveable conical pulley component 62 is at a first limit position as indicated by an upper half thereof as illustrated in in FIG. 1. This axial distance increases as the moveable conical pulley component 62 moves towards a second limit position as indicated by the phantom line or by a lower half thereof as illustrated in FIG. 1.

Radially extending inwardly from the opposite or lefthand axial end of the cylinder 128 is an integral cylinder end wall 140. The cylinder end wall 140 is turned axially and inwardly of the cylinder 128 at a location radially and inwardly spaced from the lefthand axial end thereof to define a cylindrical portion 142 and an axially displaced inner peripheral portion 144 connected to the cylindrical portion 142. As best seen in FIG. 2, the cylindrical portion 142 is undulated to frictionally engage an auxiliary cylinder 146.

The auxiliary cylinder 146 has one or righthand end portion, viewing in FIG. 1 in engagement with the cylindrical end portion 142 in press fit manner. Extending radially inwardly from the opposite or lefthand end of the auxiliary cylinder 146 is an integral auxiliary cylinder end wall 148. This auxiliary cylinder end wall 148 defines the annular disc portion 130 fixedly coupled with the reduced diameter end portion 100 of the shaft 48.

The moveable conical pulley component 62 includes a sleeve portion 150 surrounding and splined to the shaft portion 48 by the before mentioned ball spline connection 126. Surrounding the sleeve portion 150 is a tube 152. The tube 152 is disposed radially inwardly of the cylinders 128 and 146 and in liquid-tight slidable engagement with an inner periphery of the cylinder end wall 140. Viewing in FIG. 1, the tube 152 has one or righthand axial end fixed with a press fit to the moveable conical pulley component 62 at a radially inward portion thereof adjacent to the sleeve portion 150.

Slidably received by the cylinder 128 is an annular conical piston 154. The piston 154 has an inner peripheral ring portion 156 fixedly coupled with the moveable conical pulley component 62 at a portion radially outwardly of the portion at which the righthand axial end the tube 152 is fixed to the moveable conical pulley component 62. The piston 154 has an outer periphery in liquit-tight slidable engagement with a cylindrical inner wall of the cylinder 128.

The tube 152 fixed to the moveable conical pulley component 62 extends into the auxiliary cylinder 146. The opposite or lefthand axial end portion of the tube 152 is flared radially outwardly and slidably engaging an inner cylindrical wall of the auxiliary cylinder 146 in liquid-tight manner to define an auxiliary piston 158.

From the preceding description, it should be noted that the cylinder end wall 140, cylinder 128, piston 154, moveable conical pulley component 62, and tube 152 cooperate with each other to define a fluid chamber 160 variable, in volume, with axial movement of the moveable conical pulley component 62 relative to the shaft portion 48.

It should also be noted that the auxiliary cylinder end wall 148, auxiliary cylinder 146, auxiliary piston 158, moveable conical pulley component 62, sleeve portion 150, and shaft portion 48 cooperate with each other to define an auxiliary fluid chamber 162 variable, in volume, with axial movement of the moveable conical pulley component 62 relative to the shaft portion 48.

The tube 152 is formed with a radial port 164 arranged to provide fluid communication between these fluid chambers 160 and 162. The sleeve portion 150 is formed with a port 166 opening to the auxiliary fluid chamber 162.

The tube 152, auxiliary piston 158, auxiliary cylinder 146, and cylinder end wall 140 cooperate with each other to define an annular space 168. As best seen in FIG. 2, the cylindrical portion 142 and auxiliary cylinder cooperate with each other to define a plurality of angularly spaced vent passages 170 around the auxiliary cylinder 146. In order to provide fluid communication of these vent passages 170 with the annular space 168, the axially displaced inner peripheral portion 144 is undulated (see FIG. 1) at an area adjacent to the cylindrical portion 142 and cooperates with the adjacent righthand axial end of the auxiliary cylinder 146 to define a plurality of radial ports 172 establishing fluid communication between the vent passages 170 and the annular space 168.

From the preceding description, it should be noted that the escape of fluid from the annular space 168 and the entry of fluid into the annular space 168 during movement of the moveable conical pulley component 62 relative to the shaft portion 48 are effected by the radial ports 172 and vent passages 170.

Supply of fluid to and discharge thereof from the port 166 of the sleeve portion 150 is effected through an axial passage 174 of the shaft portion 48 and axially spaced radial ports 176 opening to the spline connection 126.

The assembly of the servo motor 64 is effected in the following manner. The annular conical piston 154 has its inner peripheral ring portion 156 fixedly coupled with the moveable conical pulley component 62. Subsequently, with the cylinder 128 engaging outer periphery of the piston 154, the cylinder end wall 140 is pressed toward the moveable conical pulley component 62 until the cylinder 128 receives the piston 154 deeply to assume the position as indicated by the upper half thereof as illustrated in FIG. 1. Nextly, with the outer cylindrical surface of the tube 152 engaging the inner periphery of the cylinder end wall 140, the auxiliary piston 158 is pressed towards the moveable conical pulley component 62 until the righthand axial end of the tube 152 is fixedly coupled to the moveable conical pulley component 62. Lastly, with the cylinder 128, moveable conical pulley component 62 and stationary conical pulley component 50 held in axial tight manner, the auxiliary cylinder end wall 148 is pressed towards the moveable conical pulley component 62 with the inner wall of the auxiliary cylinder 146 engaging the outer periphery of the auxiliary piston 158. The auxiliary cylinder wall 148 is pressed until the righthand axial end portion thereof firmly engages the cylindrical portion 142 of the cylinder end wall 140.

From the preceding description, it should be noted that the auxiliary cylinder 146 is reduced in diameter than the cylinder 128 is and thus occupies less radial space than the cylinder 128 does. Thus, it is now allowed to use the end cover 14 having its projected corners chamfered to provide a conical wall portion 178. This is advantageous in mounting the continuously variable transmission within a limited space under an engine hood of a car.

Figure 4:
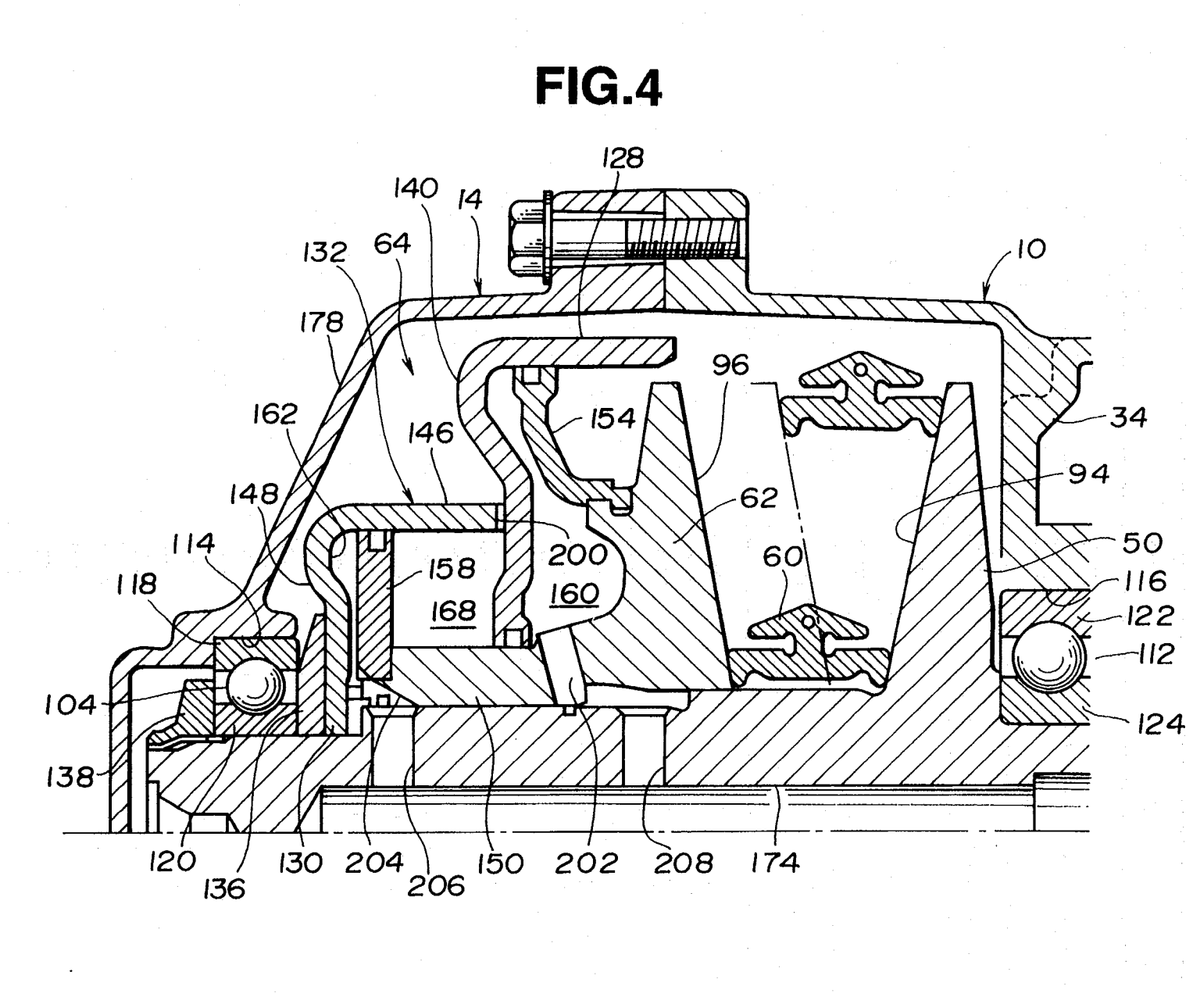
FIG. 4 is a similar view to FIG. 1, illustrating an upper half of a second embodiment of a pulley device according to the present invention.

Referring to FIG. 4, a second embodiment is described. This second embodiment is subsatntially the same as the first embodiment, but different from the latter in the elimination of the tube 152 used in the first embodiment.

As shown in FIG. 4, a sleeve portion 150 has its outer cylindrical surface slidabley engaged, in liquid-tight manner, by an inner periphery of a cylinder end wall 140. The cylinder end wall 140, extending radially inwardly from a cylinder 128, is axially recessed inwardly of the cylinder 128 to be fixedly engaged by an auxiliary cylinder 146. An annular auxiliary piston 158 has an inner periphery fixedly coupled with the sleeve portion 150 at a portion near its leading end. The outer periphery of the auxiliary piston 158 is in slidable fluid-tight engagement with the auxiliary cylinder 146.

Similarly to the first embodiment, a fluid chamber 160 is defined by the cylinder end wall 140, cylinder 128, piston 154, moveable conical pulley component 62 and sleeve portion 150. An auxiliary fluid chamber 162 is defined by an auxiliary cylinder end wall 148, and auxiliary piston 158, shaft portion 48. An annular space 168 is defined by the sleeve portion 150, auxiliary piston 158, auxiliary cylinder 146, and cylinder end wall 140.

The auxiliary cylinder 146 has one or righthand end, viewing in FIG. 4, formed with a radial slot 200. The righthand end of the auxiliary cylinder 146 is fixedly connected to the cylinder end wall 140 to define a vent passage through the radial slot 200. This vent passage is open to the annular space 168.

As different from the first embodiment, the sleeve portion 150 has formed therethrough a port 202 opening to the fluid chamber 160 and a cutout 204 opening to the auxiliary fluid chamber 162. The shaft port 48 is formed with two radial ports 206 and 208 opening to an axial passage 174. The radial port 206 communicates with the cutout 204 to supply fluid to the auxiliary fluid chamber 162, while the other radial port 208 communicates with the port 202 to supply fluid to the fluid chamber 160.

Figure 5:
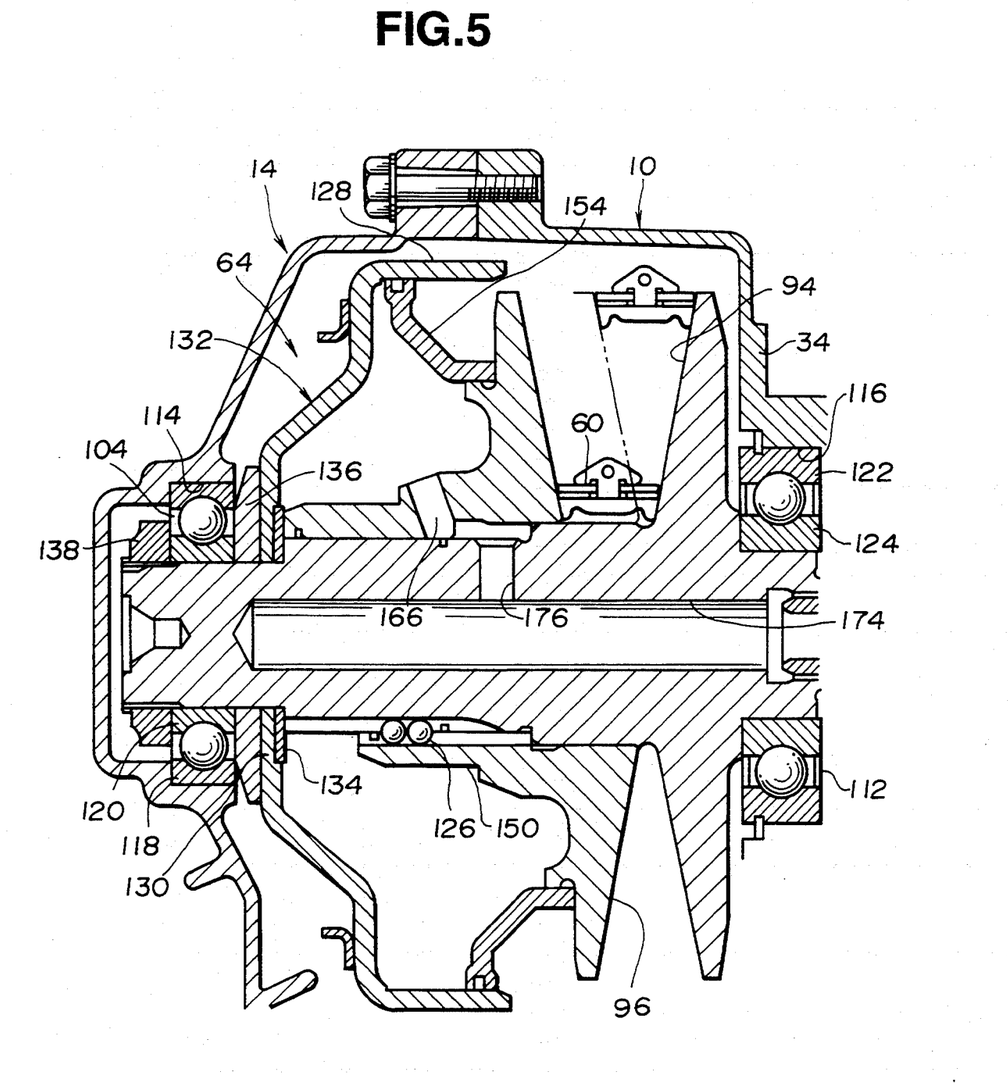
FIG. 5 is a similar view to FIG. 1, illustrating a third embodiment of a pulley device according to the present invention.

Referring to FIG. 5, a third embodiment is described. This third embodiment is different from the previously described two embodiments in that an annular disc portion 130 and a cylinder 128 are interconnected smoothly by an intermediate portion of the conical wall configuration 132. Another diference from the first embodiment resides in elimination of the auxiliary piston 158 integral with the tube 152.

What is claimed is:

1. A pulley device comprising:
a first conical pulley component including a shaft portion and a first conical face;
a second conical pulley component mounted to said shaft portion for rotation therewith and including a second conical face opposed to said first conical face, said second conical pulley component being slidably mounted to said shaft portion for movement relative to said shaft portion in such a direction as to vary a distance between said opposed first and second conical faces;
a cylinder;
means for fixedly holding said cylinder with respect to said shaft portion; and
a piston fixed to said second conical pulley component, said piston being slidably received within said cylinder;
wherein said shaft portion includes a reduced diameter end portion and a shoulder connected to said reduced diameter end portion;
wherein said fixedly holding means include an annular disc portion coupled with said reduced diameter end portion and disposed adjacent to said shoulder, an annular shim disposed between said shoulder and said annular disc portion, and means for keeping said annular disc portion and annular shim in axial tight manner with respect to said shoulder;
wherein said annular disc portion and said cylinder are fixedly interconnected by an intermediate portion; and
wherein said intermediate portion includes a cylinder end wall integral with and extending radially inwardly from said cylinder, an auxiliary cylinder having one end portion in engagement with said cylinder end wall and an opposite end, and an auxiliary cylinder end wall integral with and extending radially inwardly from said opposite end of said auxiliary cylinder, said cylinder end wall defining an annular disc portion fixedly coupled with said shaft portion.

2. A pulley device comprising:
a first conical pulley component including a shaft portion and a first conical face;
a second conical pulley component mounted to said shaft portion for rotation therewith and including a second conical face opposed to said first conical face, said second conical pulley component being slidably mounted to said shaft portion for movement relative to said shaft portion in such a direction as to vary a distance between said opposed first and second conical faces;
a cylinder;
means for fixedly holding said cylinder with respect to said shaft portion; and
a piston fixed to said second conical pulley component, said piston being slidably received within said cylinder;
wherein said fixedly holding means includes a cylinder end wall integral with and extending radially inwardly from said cylinder, an auxiliary cylinder having one end portion in engagement with said cylinder end wall and an opposite end, and an auxiliary cylinder end wall integral with and extending radially inwardly from said opposite end of said auxiliary cylinder, said auxiliary cylinder end wall defining an annular disc portion fixedly coupled with said shaft portion.

3. A pulley device as claimed in claim 2, wherein said second conical pulley component includes a sleeve portion slidably coupled with and thus surrounding said shaft portion of said first conical pulley component.

4. A pulley device as claimed in claim 3, wherein said second conical pulley component has fixed thereto a tube surrounding said sleeve portion, said tube being disposed radially inwardly of said cylinder and slidably engaging said cylinder end wall.

5. A pulley device as claimed in claim 4, wherein said cylinder end wall, cylinder, piston, second conical pulley component, and tube cooperate with each other to define a fluid chamber variable, in volume, with movement of said second conical pulley component relative to said shaft portion.

6. A pulley device as claimed in claim 5, wherein said tube has one end fixed to said second conical pulley component and an opposite end portion flared radially outwardly and slidably engaging said auxiliary cylinder in a liquid-tight manner to define an auxiliary piston.

7. A pulley device as claimed in claim 6, wherein said auxiliary cylinder end wall, auxiliary cylinder, auxiliary piston, second conical pulley component, sleeve portion and shaft portion cooperate with each other to define an auxiliary fluid chamber variable, in volume, with movement of said second conical pulley component relative to said shaft portion.

8. A pulley device as claimed in claim 7, wherein said tube, auxiliary piston, auxiliary cylinder, and cylinder end wall cooperate with each other to define an annular space.

9. A pulley device as claimed in claim 8, wherein said cylinder end wall is turned axially and inwardly of said cylinder at a location radially and inwardly spaced from said cylinder to define a cylindrical portion and an axially displaced inner peripheral portion connected to said cylindrical portion, said cylindrical portion being undulated to frictionally engage said auxiliary cylinder.

10. A pulley device as claimed in claim 9, wherein said cylindrical portion and auxiliary cylinder cooperate with each other to define a plurality of angularly spaced passages around said auxiliary cylinder.

11. A pulley device as claimed in claim 10, wherein said axially displaced inner peripheral portion is undulated at an area adjacent to said cylindrical portion and cooperates with the adjacent axial end of said auxiliary cylinder to define a plurality of radial ports establishing fluid communication between said angularly spaced passages and said annular space.

12. A pulley device as claimed in claim 11, wherein said tube is formed with a radial port arranged to provide fluid communication between said fluid chamber and auxiliary fluid chamber.

13. A pulley device as claimed in claim 12, wherein said sleeve portion is formed with a port opening to said auxiliary fluid chamber.

14. A pulley device as claimed in claim 7, wherein said sleeve portion includes a cylindrical surface slidably engaging said cylinder end wall.

15. A pulley device as claimed in claim 14, wherein said cylinder end wall, cylinder, piston, second conical pulley component, and sleeve portion cooperate with each other to define a fluid chamber variable, in volume, with movement of said second conical pulley component relative to said shaft portion.

16. A pulley device as claimed in claim 15, wherein said sleeve portion has fixed thereto an auxiliary piston slidably engaging said auxiliary cylinder in liquid tight manner.

17. A pulley device as claimed in claim 16, wherein said auxiliary cylinder end wall, auxiliary piston and shaft portion cooperate with each other to define an auxiliary fluid chamber variable, in volume, with movement of said second conical pulley component relative to said shaft portion.

18. A pulley device as claimed in claim 17, wherein said sleeve portion, auxiliary piston, auxiliary cylinder, and cylinder end wall cooperate with each other to define an annular space.

19. A pulley device as claimed in claim 18, wherein said auxiliary cylinder has a radial slot formed therethrough said one axial end portion thereof and cooperates with said cylinder end wall to define a vent passage opening to said annular space.

20. A pulley device as claimed in claim 19, wherein said sleeve portion is formed with a port opening to said fluid chamber and a cutout opening to said auxiliary fluid chamber.

* * * * *

UNITED STATES PATENT AND TRADEMARK OFFICE
CERTIFICATE OF CORRECTION

PATENT NO. : 5,439,419
DATED : August 8, 1995
INVENTOR(S) : Yamada et al.

It is certified that error appears in the above-indentified patent and that said Letters Patent is hereby corrected as shown below:

On title page, item [75], "Onuki" should read --Ohnuki--.

Signed and Sealed this

Fourteenth Day of November, 1995

Attest:

BRUCE LEHMAN

*Attesting Officer*      *Commissioner of Patents and Trademarks*